June 17, 1924.
C. R. CROMBIE ET AL
1,498,017
SELF HEALING TIRE INLAY COMPOSITION
Filed June 21, 1921
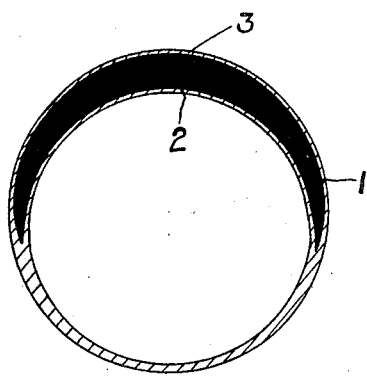

Patented June 17, 1924.

1,498,017

UNITED STATES PATENT OFFICE.

COLIN ROSS CROMBIE AND JAMES BEVERIDGE SMITH, OF EDINBURGH, SCOTLAND, ASSIGNORS TO J. P. COCHRANE AND COMPANY, LIMITED, OF EDINBURGH, SCOTLAND, A COMPANY OF GREAT BRITAIN.

SELF-HEALING TIRE INLAY COMPOSITION.

Application filed June 21, 1921. Serial No. 479,266.

*To all whom it may concern:*

Be it known that we, COLIN ROSS CROMBIE, British subject, residing at 22 Inverleith Place, Edinburgh, Scotland, and JAMES BEVERIDGE SMITH, British subject, residing at 15 Braid Hills Road, Edinburgh, Scotland, have invented new and useful Improvements in Self-Healing Tire Inlay Compositions, of which the following is a specification.

This invention relates to the inner tubes of the pneumatic tires of vehicles and has for its object to construct the tubes in such a manner as to provide for the automatic closing of punctures in the tubes.

The present invention relates more particularly to the provision of a self-sealing substance for use as an intermediate layer or layers in the construction of and previous to the vulcanization of the inner tubes of pneumatic tires for vehicles, in which the substance consists of or includes previously treated and heated raw or unvulcanized rubber with or without a resinous substance.

According to the present invention the self-sealing substance comprises raw or unvulcanized rubber which is subjected, until it reaches a plastic and pliable consistency, to a masticating process, preferably in an ordinary hot rubber mill, for a period of approximately three hours. The raw rubber is masticated and preferably compounded with resin.

The substance is applied to the inner tube of the pneumatic tire as an intermediate layer or layers between inner and outer plies of rubber, after which the pneumatic tube is completed and vulcanized in the usual manner. The composition of the plastic substance is such that it retains its plastic and pliable condition after the tube has been vulcanized so that, with the pressure of the air within the tube, it automatically closes any puncture in the tube.

The accompanying drawing illustrates, by way of example, one construction of the inner tube according to the present invention.

As illustrated in the example on the drawing, the plastic substance 1 is applied to the inner ply 2 of rubber and covered by an outer ply 3 of rubber, after which the whole is constructed to form a tube and vulcanized in the usual manner.

It will be understood that instead of a single intermediate layer of the plastic substance 1 between inner and outer plies 2 and 3, as illustrated on the drawing, a plurality of layers of the plastic substance may be used, with or without intermediate plies of vulcanizable rubber and that the plastic material may extend either completely around the tube or, as shown on the drawing, only over the portion adjacent to the tire tread.

The plastic substance consists of raw rubber masticated and compounded to the desired plastic and pliable consistency, with or without an admixture of other non-vulcanizing substances of a resinous and non-fibrous nature such as resin or Canada balsam adapted to enhance the self-sealing properties of the substance.

We give the following example of the ingredients and proportions thereof in plastic substances according to this invention, but we wish it to be understood that we do not limit ourselves to the specific ingredients or proportions mentioned therein, as they may be readily varied to suit the self-sealing properties which it is desired to obtain.

*Example.*—50 parts by weight of plantation rubber, 50 parts by weight of African rubber and 9 parts by weight of resin or Canada balsam masticated together in a hot mill for approximately 3 hours in the usual manner.

Claims—

1. In the method of manufacturing a self-sealing tire inlay composition from raw or unvulcanized rubber and resin, the steps which consists in mixing the compounds in such proportion that the rubber predominates, and subjecting the mixture, until it reaches a plastic and pliable consistency, to a masticating process in an ordinary hot rubber mill for a period of approximately three hours.

2. A self-sealing tire inlay as specified in claim 1 in the proportions of approximately 50 parts by weight of plantation rubber, 50 parts by weight of African rubber and 9 parts by weight of resin.

COLIN ROSS CROMBIE.
JAMES BEVERIDGE SMITH.